(12) United States Patent
Masubuchi et al.

(10) Patent No.: US 9,327,555 B2
(45) Date of Patent: *May 3, 2016

(54) RUBBER ARTICLE-REINFORCING STEEL CORD AND PNEUMATIC TIRE

(71) Applicant: BRIDGESTONE CORPORATION, Tokyo (JP)

(72) Inventors: Hideki Masubuchi, Kodaira (JP); Keisuke Nakamura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 14/182,935

(22) Filed: Feb. 18, 2014

(65) Prior Publication Data

US 2014/0158271 A1    Jun. 12, 2014

Related U.S. Application Data

(63) Continuation of application No. 13/266,549, filed as application No. PCT/JP2010/057566 on Apr. 28, 2010, now Pat. No. 8,833,414.

(30) Foreign Application Priority Data

Apr. 28, 2009   (JP) ................................. 2009-109845

(51) Int. Cl.
  *B60C 9/00*       (2006.01)
  *B60C 9/18*       (2006.01)
  (Continued)

(52) U.S. Cl.
  CPC ................. *B60C 9/0007* (2013.04); *B60C 9/18* (2013.01); *D07B 1/0613* (2013.01);
  (Continued)

(58) Field of Classification Search
  CPC ................ B60C 9/0007; B60C 9/2006; B60C 2009/209; B60C 2009/0085; D07B 1/0613
  See application file for complete search history.

(56) References Cited

U.S. PATENT DOCUMENTS 5,461,850 A   10/1995  Bruyneel et al.
6,863,103 B1   3/2005  Masubuchi et al.
(Continued)

FOREIGN PATENT DOCUMENTS

CN    1091791 A    9/1994
CN    1668804 A    9/2005
(Continued)

OTHER PUBLICATIONS

English machine translation of JP11-021775, dated Jan. 1999.*
(Continued)

*Primary Examiner* — Justin Fischer
*Assistant Examiner* — Robert Dye
(74) *Attorney, Agent, or Firm* — Sughrue Mion, PLLC

(57) ABSTRACT

Provided is a steel cord for reinforcing a rubber article, which has an improved durability against so-called cuts, such as notches and perforations, which are generated in the case of treading on an obtusely or sharply pointed projection, without decreasing the strength in the axial direction of the cord, and without increasing the thickness in the radial direction, namely without increasing the weight of a tire, as well as a tire using the steel cord for reinforcing a rubber article as a reinforcing material, especially a construction vehicle tire. Also provided is a steel cord for reinforcing rubber articles with a multi-twisted structure formed by twisting a plurality of sheath strands formed by twisting a plurality of wires around a core strand formed by twisting a plurality of wires, and the core strand being constituted of an at least three-layer-twisted structure formed by twisting core filaments and sheath filaments. The lowest tensile breaking strength of filament bs and the tensile breaking strength of steel cord Bc satisfy the relationship represented by the following formula:

$bs/Bc \times 100 \geq 0.65$.

4 Claims, 2 Drawing Sheets

(51) Int. Cl.
    *D02G 3/48* (2006.01)
    *D07B 1/06* (2006.01)
    *B60C 9/20* (2006.01)

(52) U.S. Cl.
    CPC ...... *B60C 9/2006* (2013.04); *B60C 2009/0085* (2013.04); *B60C 2009/209* (2013.04); *B60C 2009/2077* (2013.04); *B60C 2009/2093* (2013.04); *D07B 2201/2006* (2013.01); *D07B 2201/2061* (2013.01); *Y10S 57/902* (2013.01); *Y10T 428/2929* (2015.01)

(56) References Cited

U.S. PATENT DOCUMENTS 7,152,391 B2 * 12/2006 Vanneste ............... B60C 9/0007
                                                      57/237
2005/0257874 A1    11/2005 Soenen et al.

FOREIGN PATENT DOCUMENTS

| EP | 0 987 128 A2 | 3/2000 |
| JP | 11-021775 * | 1/1999 |
| JP | 2002-030586 A | 1/2002 |
| JP | 2002-339277 A | 11/2002 |
| JP | 2006-022440 A | 1/2006 |
| JP | 2006-214062 A | 8/2006 |
| JP | 2008-150757 A | 7/2008 |
| WO | 01/34900 A1 | 5/2001 |

OTHER PUBLICATIONS

English machine translation of JP2006-214062, dated Aug. 2006.*
Extended European Search Report, dated Jun. 13, 2013, issued in European Patent Application No. 10769782.3.
Chinese Office Action and Search Report, dated Jul. 26, 2013, issued in corresponding Chinese Patent Application No. 201080019127.8.
International Search Report of PCT/JP2010/057566, dated Aug. 3, 2010.
Communication dated Aug. 5, 2015 from the State Intellectual Property Office of the People's Republic of China in counterpart Application No. 201310722504.X.

* cited by examiner

RUBBER ARTICLE-REINFORCING STEEL CORD AND PNEUMATIC TIRE

CROSS REFERENCE TO RELATED APPLICATIONS

This application is a continuation of U.S. application Ser. No. 13/266,549, filed Oct. 27, 2011, which is a National Stage of International Application No. PCT/JP2010/057566, filed on Apr. 28, 2010, which claims priority from Japanese Patent Application No. 2009-109845, filed on Apr. 28, 2009, the contents of all of which are incorporated herein by reference in their entirety.

TECHNICAL FIELD

The present invention relates to a steel cord for reinforcing rubber articles and a pneumatic tire (hereinafter, also simply referred to as "cord" or "tire"), and more particularly, to a steel cord for reinforcing rubber articles suitably used for a pneumatic radial tire for a heavy vehicle such as a transport vehicle or a construction machine, and a tire using the same.

BACKGROUND ART

Since a tire for a construction vehicle runs over rough ground surfaces, and at the same time, is subjected to a heavy load, a high tensile strength (breaking load) is required for steel cords used for reinforcing layer such as a carcass or a belt for a tire for the construction vehicle. Consequently, for such reinforcing layers, a steel cord with a so-called multi-twisted structure such as a 7×(3+9) structure or a 7×(3+9+15) structure in which a plurality of sheath strands are twisted around a core strand is generally used.

Further, since the tire for a construction vehicle frequently suffers a damage as a result of a heavy load while being in contact with a rough ground surface, such countermeasures have been taken, as use of a large diameter cord as a reinforcing cord, and use of a so-called high tensile strength steel to increase the tensile breaking force per unit area of the cord, so as to increase the tensile breaking strength in the axial direction of the cord.

However, a problem has been known with respect to a multi-twisted cord which is a plurality of twisted strands, that the cord strength is lower than the total of the strengths of the wires to such an extent as is unexplainable from the decrease attributable to the twist angle. To cope with the problem, for example, Patent Document 1 discloses a technique for avoiding premature breakage of a part of the wires to suppress the decrease of the strength in the axial direction of the cord.

Patent Document 2 discloses a technique for improving the cut resistant property of a steel cord for reinforcing rubber articles with a multi-twisted structure in which a plurality of sheath strands are twisted around a plurality of core strands placed in mutually parallel orientation, without increasing the rubber weight of a tire and without generating an early stage propagation of a crack between neighboring cords, by making the number of the core strands and the number of the sheath strand and the twist pitch of the sheath strands and the diameters of the sheath strands each satisfy a predetermined relation.

Further, Patent Document 3 discloses a technique for improving the cut resistant property of a steel cord with a multi-twisted structure in which sheath strands are twisted around core strands, without decreasing the strength of the axial direction of the cord, by making the ratio of the minimum diameter of the profile shape of the cord at the cross-section orthogonal to the cord axes to the maximum diameter thereof and the ratio of the diameter of the wire constituting the outermost layer of the sheath strand to the diameter of the sheath strand each in a predetermined range.

RELATED ART DOCUMENTS

Patent Document

Patent Document 1: WO 01/034900 (claims or the like)
Patent Document 2: Japanese Unexamined Patent Application Publication No. 2002-339277 (claims or the like)
Patent Document 3: Japanese Unexamined Patent Application Publication No. 2006-22440 (claims or the like)

SUMMARY OF THE INVENTION

Problems to be Solved by the Invention

However, a conventional steel cord as a reinforcing member for a tire for a construction vehicle has not been very satisfactory under circumstances as described below. More particularly, belts, especially the innermost belt layer, of a tire for a construction vehicle forced to run on rough surfaces, is bent widely, when it treads on a relatively obtuse projection, and it has been often observed that a steel cord for reinforcement is led to premature cord breakage by a tensile force in the axial direction of the cord. Meanwhile, when the belts tread on a relatively sharply pointed projection, the belts are bent locally, and it has been often observed that cord breakage occurs by a shear force from the projection in a belt reinforcing layer closest to the tread surface.

From the above, for a steel cord to be used as a reinforcing material for a construction vehicle tire, both the tensile strength in the axial direction of the cord and the strength in the shearing direction are required. In case a belt layer is thick, when it is bent by treading on a projection, an inner side belt cord, namely located on an outer side of a bend, undergoes easily a tensile force which leads to the breaking elongation. Consequently, a belt layer is required to be as thin as possible.

Accordingly, an object of the present invention is to provide a steel cord for reinforcing a rubber article, which has an improved durability against so-called cuts, such as notches and perforations, which are generated in the case of treading on an obtusely or sharply pointed projection, without decreasing the strength in the axial direction of the cord, and without increasing the thickness in the radial direction, namely without increasing the weight of a tire, as well as a tire using the steel cord for reinforcing a rubber article as a reinforcing material, especially a construction vehicle tire.

Means for Solving the Problems

In order to solve the above problems, the present inventors intensively studied to find out that the object can be attained by adopting the following constitution, thereby completing the present invention.

More particularly, a steel cord for reinforcing rubber articles according to the present invention with a multi-twisted structure formed by twisting a plurality of sheath strands formed by twisting a plurality of wires around a core strand formed by twisting a plurality of wires, and the core strand being constituted of an at least three-layer-twisted structure formed by twisting core filaments and sheath filaments, is characterized in that the lowest tensile breaking strength of filament bs and the tensile breaking strength of steel cord Bc satisfy the relationship represented by the following formula:

$$bs/Bc \times 100 \geq 0.65.$$

With respect to the steel cord for reinforcing rubber articles according to the present invention, it is preferable that the filament diameter of the thinnest filament of the filaments constituting the steel cord ds and the steel cord diameter Dc satisfy the relationship represented by the following formula:

$$ds/Dc \times 100 \geq 5.70.$$

It is preferable that seven to nine sheath strands be twisted around the core strand.

Additionally, a pneumatic tire according to the present invention having a carcass comprising ply(s) of radially oriented cords, as well as at least four layers of belts each with arrayed cords, which are crossed between the laminated layers located on the outer side in the radial direction at a crown part of the carcass, is characterized in that, as a cord constituting at least two layers of the belts, the aforementioned steel cord for reinforcing rubber articles is used.

The present invention is particularly valuable for a tire for a construction vehicle.

Effects of the Invention

According to the present invention, a steel cord for reinforcing rubber articles, which has an improved so-called durability against cuts in the case of treading on an obtusely or sharply pointed projection, as well as a tire, especially a tire for a construction vehicle can be attained, without decreasing the strength in the axial direction of the cord, and without increasing the weight of the tire.

MODE FOR CARRYING OUT THE INVENTION

Preferred embodiments of the present invention will be described specifically with reference to the drawings.

Figure 1:
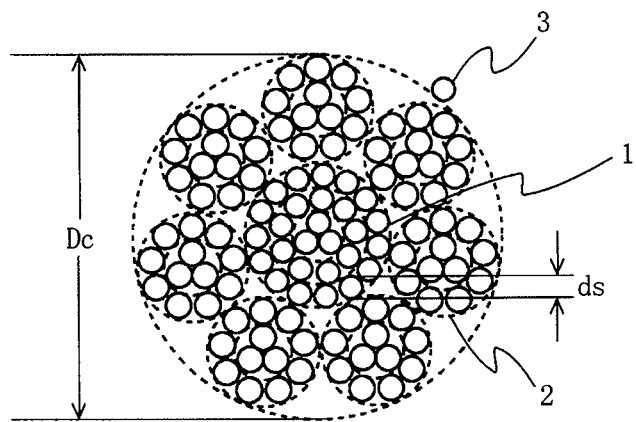
FIG. 1 is a cross-sectional view of a steel cord for reinforcing rubber articles in Example 1.

FIG. 1 is a cross-sectional view of a steel cord for reinforcing rubber articles of one preferred embodiment of the present invention. The illustrated steel cord for reinforcing rubber articles is a steel cord for reinforcing rubber articles with a multi-twisted structure formed by twisting sheath strands 2 around a core strand 1, and the core strand 1 being constituted of an at least three-layer-twisted structure formed by twisting core filaments and sheath filaments (the illustrated example: core filament: three layers, sheath filament: two layers). Further, on the outer circumference of the cord, a wrapping wire 3 is coiled spirally along the outer circumference of the cord.

In the preferred example shown in FIG. 1, the core strand 1 has a three-layer-twisted structure of 3+9+15 and the sheath strand 2 has a two-layer-twisted structure of 3+9. Although all of the wire diameters of the core strand 1 and sheath strand 2, and the twisted structure should not be particularly restricted, preferably the core strand 1 has a three-layer-twisted structure and the sheath strand 2 has a two-layer-twisted structure in order to attain the intended object of the present invention. In another preferred example, the core strand has a three-layer-twisted structure of 3+9+11 and the sheath strand has a two-layer-twisted structure of 3+8.

In the present invention, it is essential that the lowest tensile breaking strength of filament bs and the tensile breaking strength of steel cord Bc satisfy the relationship represented by the following formula:

$$bs/Bc \times 100 \geq 0.65,$$

and preferably, by the following formula:

$$bs/Bc \times 100 > 0.70.$$

In case the tensile breaking strength bs and the tensile breaking strength Bc have the relationship represented by the following formula:
ti $bs/Bc \times 100 < 0.65$,
when the steel cord receives a shear force, the filaments result in premature breakage prior to the breakage of the steel cord, and consequently, it becomes hard to obtain the required resistance to shear force.

In the present invention, it is preferable that the filament diameter of the thinnest filament of the filaments constituting the steel cord with the multi-twisted structure ds and the steel cord diameter Dc satisfy the relationship represented by the following formula:

$$ds/Dc \times 100 \geq 5.70,$$

and when the relationship represented by the following formula:

$$ds/Dc \times 100 < 5.70$$

is satisfied, it also becomes hard to obtain the required resistance to shear force.

Further, it is preferable that 7 to 9 sheath strands 2 be wound around a core strand 1. In case the number of the sheath strands 2 is 6 or less, it becomes hard to obtain a sufficient tensile strength with respect to the cord cross section. Meanwhile, in case the number of windings of the sheath strands 2 is 10 or more, the diameter of a filament constituting the core strand 1 needs to be made extremely large, so that the flexural rigidity of the steel cord becomes high, and the surface strain of the filaments increases when the steel cord is applied to a rubber article such as a tire, and it becomes hard to obtain sufficient resistance to fatigue.

Still further, it is preferable that line contact be realized in each of the core strand 1 and the sheath strand 2, and that in order to avoid a breakage due to stress concentration, a same direction twisted structure be applied.

Still further, in order to secure the strength of the rubber article, it is preferable to use a high tensile strength steel with the carbon content of 0.80 to 1.00% by mass for the wires used.

Figure 5:
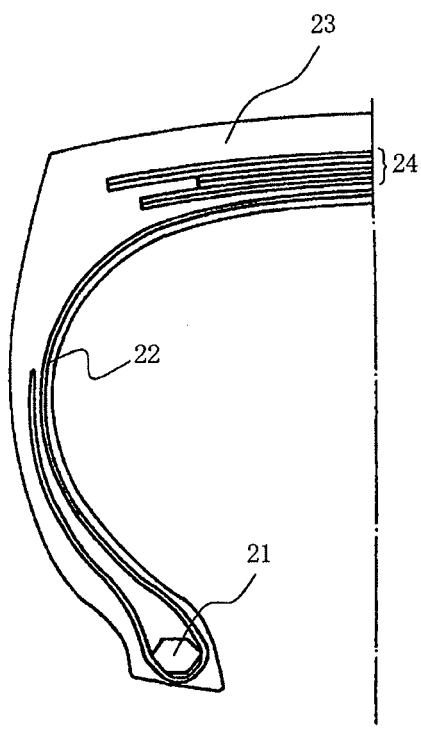
FIG. 5 is a half sectional view in the tire width direction of a pneumatic tire of an embodiment of the present invention.

FIG. 5 shows a half sectional view of one preferred example of tires of the present invention. The illustrated tire has a carcass 22 comprising a ply of radially oriented cords, as well as at least four layers of belts 24 (six layers in the illustrated example) each with arrayed cords, which are crossed between the laminated layers located on the outer side in the tire radial direction at a crown part thereof. In the drawing, the reference sign 21 represents a bead core and the reference sign 23 represents a tread portion.

In the tire of the present invention, for the cords constituting at least two layers of the belts 24, steel cords for reinforcing rubber articles of the present invention are used. By this, an excellent durability against cuts can be attained, without decreasing the strength in the axial direction of the cord, and without increasing the weight of a tire. The present invention is particularly valuable when applied to a tire for a construction vehicle.

EXAMPLES

The present invention will be described below more specifically by way of Examples.

Figure 2:
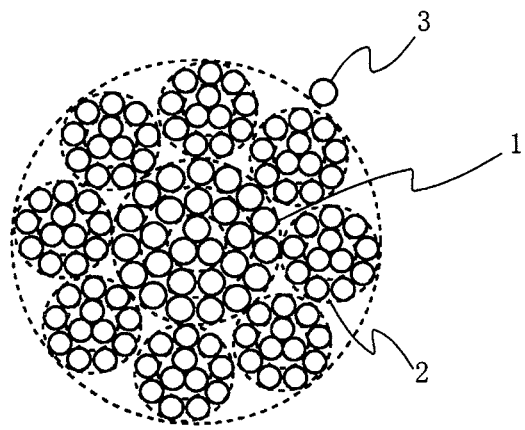
FIG. 2 is a cross-sectional view of a steel cord for reinforcing rubber articles in Example 2.
Figure 3:
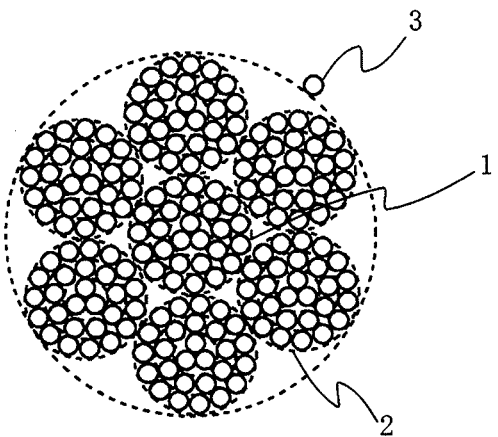
FIG. 3 is a cross-sectional view of a steel cord for reinforcing rubber articles in Conventional Example 1.
Figure 4:
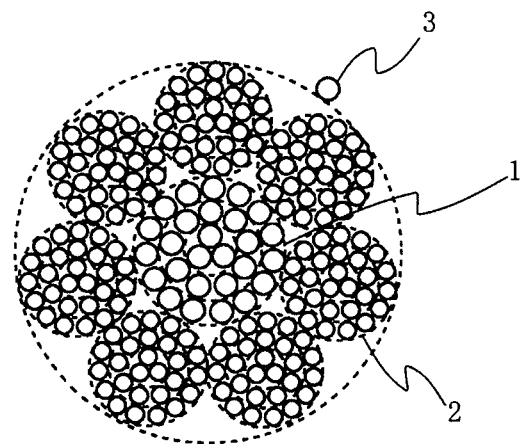
FIG. 4 is a cross-sectional view of a steel cord for reinforcing rubber articles in Comparative Example.

Steel cords of Conventional Example 1 (FIG. 3), Conventional Example 2, Example 1 (FIG. 1), Example 2 (FIG. 2), Example 3 and Comparative Example (FIG. 4) were manufactured according to the conditions listed in the following Table. All of the wires used for the steel cords were high tensile strength steel having a carbon content of 0.82% by mass. The obtained cords were used for belt layers of a tire for a construction vehicle. The following evaluation tests were conducted on test cords and test tires.

(Resistance to Shear Failure)

The resistances to shear failure of these sample steel cords were evaluated by a Charpy impact tester. The results were expressed by indices based on the steel cord according to Conventional Example as 100. The higher value means the better resistance to shear failure.

(Tire Weight)

The weights of the respective test tires were measured and the results were expressed by indices based on the tire according to Conventional Example 1 as 100. The larger value means the larger weight.

(Number of Cuts Incurred)

Respect test tires manufactured by way of trial in which the respective test cords were applied to the belts were seated on the standard rim according to the TRA standard (U.S.), and mounted on a construction vehicle, which traveled for 1000 hours. Thereafter the number of cuts having reached the belt layer was counted in the section equivalent to ⅕ of the circumferential length of each tire. The obtained results are shown in Table 1.

TABLE 1

|   |   |   | Conventional Example 1 | Conventional Example 2 | Example 1 | Example 2 | Comparative Example | Example 3 |
|---|---|---|---|---|---|---|---|---|
|   |   | Cord structure | 1 + 6 | 1 + 6 | 1 + 7 | 1 + 8 | 1 + 7 | 1 + 7 |
| Core strand |   | Structure | 3 + 9 + 15 | 3 + 9 + 12 | 3 + 9 + 15 | 3 + 9 + 15 | 3 + 9 + 15 | 3 + 9 + 11 |
|   |   | Core filament strength bs (N) | 215 | 180 | 300 | 350 | 300 | 230 |
|   |   | First sheath filament strength bs (N) | 215 | 180 | 300 | 350 | 300 | 230 |
|   |   | Second sheath filament strength bs (N) | 215 | 300 | 300 | 350 | 300 | 420 |
|   |   | Core filament diameter ds (mm) | 0.290 | 0.260 | 0.350 | 0.400 | 0.350 | 0.300 |
|   |   | First sheath filament diameter ds (mm) | 0.290 | 0.260 | 0.350 | 0.400 | 0.350 | 0.300 |
|   |   | Second sheath filament diameter ds (mm) | 0.290 | 0.350 | 0.350 | 0.400 | 0.350 | 0.455 |
| Sheath strand |   | Structure | 3 + 9 + 15 | 3 + 9 + 12 | 3 + 9 | 3 + 9 | 3 + 9 + 15 | 3 + 9 |
|   |   | Core filament strength bs (N) | 215 | 180 | 300 | 300 | 190 | 345 |
|   |   | First Sheath filament strength bs (N) | 215 | 180 | 300 | 300 | 190 | 345 |
|   |   | Second Sheath filament strength bs (N) | 215 | 300 | — | — | 190 | — |
|   |   | Core filament diameter ds (mm) | 0.290 | 0.260 | 0.395 | 0.350 | 0.270 | 0.395 |
|   |   | First sheath filament diameter ds (mm) | 0.290 | 0.260 | 0.395 | 0.350 | 0.270 | 0.395 |
|   |   | Second sheath filament diameter ds(mm) | 0.290 | 0.350 | — | — | 0.270 | — |
| Cord |   | Cord strength Bc (N) | 34200 | 35500 | 34000 | 34100 | 37000 | 35000 |
|   |   | Cord diameter Dc (mm) | 5.18 | 5.18 | 5.27 | 5.21 | 5.30 | 5.26 |
|   | bs/Bc × 100 value |   | 0.63 | 0.51 | 0.88 | 0.88 | 0.51 | 0.66 |
|   | ds/Dc × 100 value |   | 5.59 | 5.02 | 6.64 | 6.72 | 5.09 | 5.70 |
|   | Resistance to shear failure (Index) |   | 100 | 105 | 122 | 126 | 103 | 127 |
|   | Tire weight (Index) |   | 100 | 100.3 | 100.3 | 100 | 100.5 | 100.1 |
|   | Number of cuts incurred (n) |   | 12 | 10 | 1 | 1 | 14 | 1 |

From the evaluation results shown in Table 1, it is found that each of the test steel cords of Examples 1 to 3 has an excellent resistance to shear failure as compared with the test steel cords of the Conventional Examples and Comparative Example. Accordingly, it was confirmed that, by the present invention, a tire for a construction vehicle whose cut resistant property was improved can be obtained.

REFERENCE SIGNS LIST

1 Core strand
2 Sheath strand
3 Wrapping wire
21 Bead core
22 Carcass
23 Tread
24 Belt

The invention claimed is:

1. A steel cord for reinforcing rubber articles with a multi-twisted structure comprising a core strand and a plurality of sheath strands,
   wherein the core strand is formed by twisting a plurality of filaments,
   wherein each of the sheath strands is formed by twisting a plurality of filaments,
   wherein the core strand is constituted of an at least three-layer-twisted structure formed by twisting core filaments and sheath filaments,
   wherein the multi-twisted structure is formed by twisting the plurality of sheath strands around the core strand,
   wherein the lowest tensile breaking strength of filament bs (N) and the tensile breaking strength of steel cord Bc (N) satisfy the relationship represented by the following formula:

$bs/Bc \times 100 \geq 0.65$, wherein there are seven to nine sheath strands twisted around the core strand, and
   wherein the core strand has a structure of 3+9+11.

2. The steel cord for reinforcing rubber articles according to claim 1, wherein the filament diameter of the thinnest filament of the filaments constituting the steel cord ds and the diameter of the steel cord Dc satisfy the relationship represented by the following formula:

$ds/Dc \times 100 \geq 5.70$.

3. A pneumatic tire having a carcass comprising a ply of radially oriented cords, as well as at least four layers of belts each with arrayed cords, which are crossed between the laminated layers located on the outer side in the radial direction at a crown part of the carcass,
   wherein, as a cord constituting at least two layers of the belts, the steel cord for reinforcing rubber articles according to claim 1 is used.

4. The pneumatic tire according to claim 3, which is a tire for a construction vehicle.

\* \* \* \* \*